United States Patent
Shapiro

[11] 3,723,749
[45] Mar. 27, 1973

[54] DRIVING CIRCUIT FOR LIQUID CRYSTAL DISPLAYS

[75] Inventor: Robert C. Shapiro, Butler, N.J.

[73] Assignee: Timex Corporation, Waterbury, Conn.

[22] Filed: Apr. 14, 1972

[21] Appl. No.: 244,082

[52] U.S. Cl. ............... 307/38, 340/324 M, 340/336, 350/160 LC
[51] Int. Cl. ............................................. G02f 1/28
[58] Field of Search ....307/38, 251; 340/324 M, 336; 315/169; 350/160 LC

[56] References Cited

UNITED STATES PATENTS

| | | |
|---|---|---|
| 3,519,330 | 7/1970 | Heilmeier ........................ 350/160 LC |
| 3,551,689 | 12/1970 | Zanoni ................................. 307/38 |
| 3,575,492 | 4/1971 | Nester ........................... 350/160 LC |

Primary Examiner—Robert K. Schaefer
Assistant Examiner—William J. Smith
Attorney—Richard A. Joel

[57] ABSTRACT

A driving circuit for liquid crystal displays is disclosed. The circuit comprises a single field effect transistor which operates in two different modes to drive the display. The field effect transistor (FET) is connected between a high voltage inverter and the display while a second high voltage inverter is also connected to the display. When input signals are fed to the FET, it acts as an inverter in one direction and as a source follower in the other direction driving the liquid crystal display with AC voltage.

7 Claims, 4 Drawing Figures

PATENTED MAR 27 1973 3,723,749

3,723,749

DRIVING CIRCUIT FOR LIQUID CRYSTAL DISPLAYS

BACKGROUND OF THE INVENTION

The present invention relates to displays and particularly to liquid crystal displays for timepieces and driving circuits therefor.

In liquid crystal displays designed for the horological field, it is necessary to provide means for operating the various displays elements in a predetermined manner. One prior art circuit is shown in U.S. Pat. No. 3,388,292 to Joseph R. Burns wherein a plurality of light cells each include an output field-effect transistor having its conductive path connected in series with a light emissive element. This patent specifically pertains to an insulated gate field-effect transistor selection and holding circuit for a display.

U. S. Pat. No. 3,551,689 to Louis A. Zanoni discloses a switch for an alternating current driven liquid crystal element comprising to emitter-to-collector path of a bipolar transistor in series with a capacitor. The display employs one switch per display element. Another patent in this technological area is U.S. Pat. No. 3,519,330 to G.H. Heilmeier.

SUMMARY OF THE INVENTION

As distinguished from the prior art discussed above, the present invention relates to a new and improved driving circuit for liquid crystal displays. The invention comprises a liquid crystal display coupled between two high voltage inverters and a single field effect transistor or FET connected between one inverter and the display to control the operation of the display. The single FET functions in two different modes to control the display. The FET acts as an inverter in one direction and as a source follower to drive the liquid crystal with AC voltage in a predetermined manner.

It is, therefore, an object of this invention to provide a new and improved circuit for driving a liquid crystal display.

Another object of this invention is to provide a new and improved driving circuit for liquid crystal displays using a single driving element.

A more specific object of this invention is to provide a unique driving circuit for horological displays of the liquid crystal type using a single field effect transistor operated in two different modes.

BRIEF DESCRIPTION OF THE DRAWINGS

Other objects and advantages of the present invention may be more clearly seen when viewed in conjunction with the accompanying drawings wherein.

DETAILED DESCRIPTION OF THE INVENTION

Figure 1:
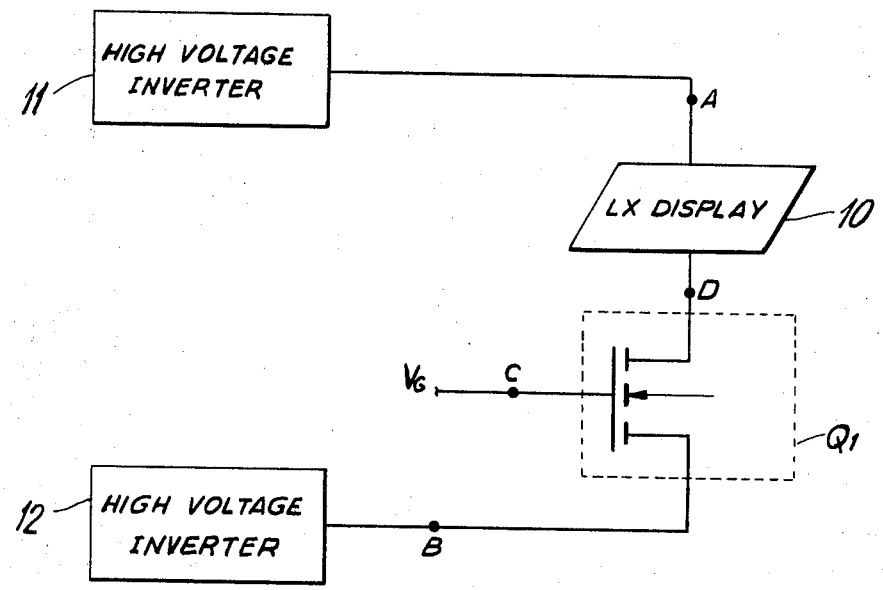
FIG. 1 is a circuit diagram illustrating the unique display driving arrangement of the invention.

Referring to FIG. 1 of the drawings, the invention comprises a driving circuit for a liquid crystal display 10 which includes a single field effect transistor $Q_1$ and two high voltage inverters 11 and 12. The liquid crystal display is coupled between the high voltage inverters 11 and 12 while the FET driver $Q_1$ is connected between the display 10 and one inverter 12. With the circuit as thus illustrated, it is possible to drive all or part of the display 10 using a single field effect transistor $Q_1$ in two different modes. When input signals are fed to the FET, it acts as an inverter in one direction and a source follower in the other direction driving the liquid crystal display with AC voltage.

As an illustration, with the output $V_1$ of the high voltage inverter 11 at the highest potential $V_1 = 15$ VDC, in the system and the voltage at the gate of transistor $Q_1$, VG equal to $V_1$, $Q_1$ will act as an inverter. The voltage across the liquid crystal display 10 from point A to point D, $V_{AD}$, would be equal to $V_1$ minus the voltage from point D to point B, $V_{DB}$, or:

$$V_{AD} = V_1 - V_{DB}$$

or $$V_1 = {}^V\text{Saturation } Q_1,$$

where voltage at inverter 12 = $V_1$ and $V_1$ = O VDC (Ground).

On the other hand, with the output of the high voltage inverter 12 at the highest system potential, that is, $V_1 = 15$ VDC and $V_G = V_1$, $Q_1$ will act as an FET source follower. The voltage across the liquid crystal display $V_{DA}$ would be as follows:

$$V_{DA} = V_1 - {}^V\text{Threshold of } Q_1$$

or $$V_{DA} = {}_{VG} - {}^V\text{Threshold of } Q_1$$

where $$V_1 = 0 \text{ VDC (Ground)}$$

While $Q_1$ is shown in FIG. 1 as an n-channel enhancement FET, a p-channel enhancement FET could also be used. In the latter instance, the polarity of $V_G$ would have to be reversed. Thus for display, $V_G$ would be 0 VDC and for non-display, $V_G$ would equal the highest system potential, for example 15 volts. The 15 volt potential is selected merely for purposes of illustration and the circuit would function equally well with other voltages.

Since the voltage across the liquid crystal display 10 will not be the same in both modes of $Q_1$ operation, it is necessary to make the duty cycles of the high voltage inverters 11 and 12 unsymmetrical. This will eliminate any DC bias across the liquid crystal display 10. Also, for the system to function, the off impedance the the $Q_1$-FET must be much higher than that of the display 10. Typically, an order of magnitude ten times greater would be satisfactory.

Figure 2:
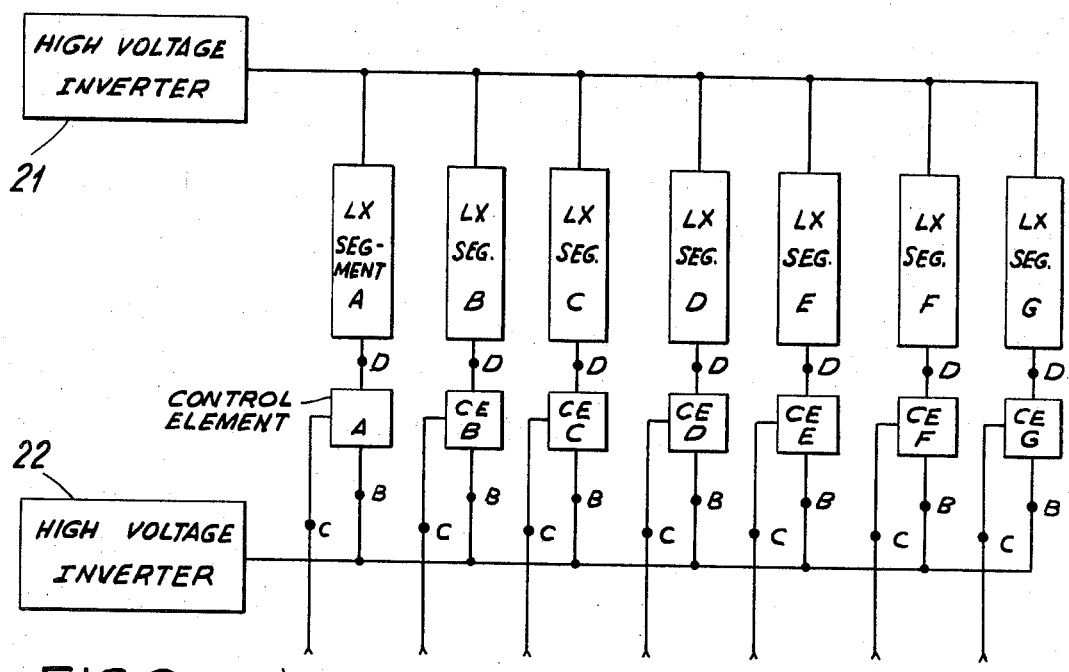
FIG. 2 shows the invention used in conjunction with a seven segment numeric display.
Figure 3:
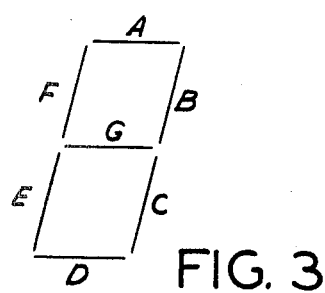
FIG. 3 shows a typical segment designation.
Figure 4:
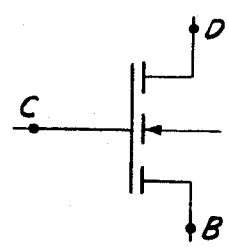
FIG. 4 illustrates a typical control element.

FIG. 2 depicts the use of the invention in a common seven segment display wherein high voltage inverters 21 and 22 are employed with control elements, CE, to activate the individual segments A to G of a display 20 as desired. A typical seven segment display 20 is shown in FIG. 3 while a typical control element 30 is shown in FIG. 4.

The system of FIG. 2 functions precisely as described with reference to the system of FIG. 1 and hence a more detailed description is not deemed necessary. In this embodiment, input control signals are fed to the gate of control elements A to G. The display segments are all connected across the inverters 21 and 22 to function similar to the display 10 of FIG. 1.

Using the present invention, it is therefore possible to drive a liquid crystal display with a single element such as a p-channel enhancement type MOSFET which operates in two different modes. This eliminates the rather complicated arrangements of the prior art and provides a display system which is particularly suited for use in the horological field.

It is to be understood that the above-described arrangements are merely illustrative examples of the application. Numerous other arrangements may be readily devise by those skilled in the art which will embody the principles of the invention and fall within the spirit and scope thereof.

I claim:

1. A driving circuit for a liquid crystal display having a first and second terminal for receiving or transmitting signals which comprises:
   a first high voltage inverter connected to the first terminal of the display,
   a field effect transistor connected to the second terminal of the display, and
   a second high voltage inverter connected to the field effect transistor, said transistor controlling the operation of the display when the signal level of a control signal to the transistor is varied.

2. A driving circuit in accordance with claim 1 wherein:
   the first high voltage rectifier and the second high voltage rectifier have unsymmetrical duty cycles to eliminate any DC bias across the liquid crystal display.

3. A driving circuit in accordance with claim 2 wherein:
   the field effect transistor has an off impedance substantially higher than that of the liquid crystal display.

4. A driving circuit for a liquid crystal numeric display comprising a plurality of segments which includes:
   a first and a second high voltage inverter having the segments connected in parallel therebetween, and
   a control element connected between each display and the second high voltage inverter and having an input to receive control signals to operate the corresponding segment.

5. A driving circuit in accordance with claim 4 wherein:
   the control elements are field effect transistors.

6. A driving circuit in accordance with claim 4 wherein:
   the control elements are n-channel or p-channel enhancement type MOSFETs.

7. A driving circuit for a liquid crystal display comprising:
   a first and a second high voltage inverter connected to the liquid crystal display, and
   a field effect transistor connected between one of the inverters and the display, said transistor acting as an inverter in one direction when input signals are fed thereto and as a source follower in the other direction thereby driving the display.

* * * * *